United States Patent
Kim et al.

(10) Patent No.: US 12,355,106 B2
(45) Date of Patent: Jul. 8, 2025

(54) BATTERY MODULE COMPRISING FLIP PORTION

(71) Applicant: SK On Co., Ltd., Seoul (KR)

(72) Inventors: Suk Chul Kim, Daejeon (KR); Yong Uk Kim, Daejeon (KR); Jong Ho Seok, Daejeon (KR)

(73) Assignee: SK On Co., Ltd., Seoul (KR)

( * ) Notice: Subject to any disclaimer, the term of this patent is extended or adjusted under 35 U.S.C. 154(b) by 808 days.

(21) Appl. No.: 17/110,426

(22) Filed: Dec. 3, 2020

(65) Prior Publication Data

US 2021/0175484 A1 Jun. 10, 2021

(30) Foreign Application Priority Data

Dec. 4, 2019 (KR) .................. 10-2019-0159872

(51) Int. Cl.
*H01M 50/502* (2021.01)
*H01M 50/155* (2021.01)
*H01M 50/20* (2021.01)

(52) U.S. Cl.
CPC ....... *H01M 50/502* (2021.01); *H01M 50/155* (2021.01); *H01M 50/20* (2021.01)

(58) Field of Classification Search
CPC .. H01M 50/502; H01M 50/155; H01M 50/20; H01M 2220/20; H01M 10/613; H01M 10/647; H01M 10/6562; H01M 50/211; H01M 50/291; H01M 50/293; H01M 50/3425; H01M 50/209;

(Continued)

(56) References Cited

U.S. PATENT DOCUMENTS 4,339,036 A * 7/1982 Jensen ................ B65D 5/4295
220/676
2015/0147605 A1 5/2015 Kim et al.
(Continued)

FOREIGN PATENT DOCUMENTS

CN 106450075 A 2/2017
CN 107615516 A 1/2018
(Continued)

OTHER PUBLICATIONS

Machine translation of KR 2016-0078035A, Lee et al. (Year: 2016).*

(Continued)

*Primary Examiner* — Adam A Arciero
(74) *Attorney, Agent, or Firm* — The Webb Law Firm

(57) ABSTRACT

A battery module includes a cell support unit accommodating at least one or more secondary battery cells, a body frame member on which a plurality of the cell support units are installed, and a cover member disposed between adjacent cell support units. The cover member includes a fixed plate portion fixed between the adjacent cell support units, and a flip portion connected to the fixed plate portion and disposed between electrode tabs of the secondary battery cells adjacent to each other to separate a space between the electrode tabs externally, the flip portion being pushed by internal gas or flame of the secondary battery cells discharged due to rupturing of the secondary battery cells, to be position-moved so that the space between the electrode tabs communicate externally.

9 Claims, 5 Drawing Sheets

(58) Field of Classification Search
CPC .............. H01M 50/24; H01M 50/308; H01M 2200/20; H01M 2220/10; H01M 50/593; Y02E 60/10; A62C 3/16

See application file for complete search history.

(56) References Cited

U.S. PATENT DOCUMENTS

| | | | |
|---|---|---|---|
| 2016/0197321 | A1 | 7/2016 | Tyler et al. |
| 2017/0141371 | A1 | 5/2017 | Toshioka et al. |
| 2017/0294634 | A1 | 10/2017 | Choi |
| 2018/0097211 | A1* | 4/2018 | Choi ................... H01M 50/262 |
| 2018/0145294 | A1 | 5/2018 | Choi et al. |
| 2020/0044228 | A1 | 2/2020 | Lee et al. |
| 2020/0381685 | A1* | 12/2020 | Yanagihara ......... H01M 50/507 |
| 2021/0013478 | A1 | 1/2021 | Sasaki et al. |

FOREIGN PATENT DOCUMENTS

| | | |
|---|---|---|
| CN | 207800731 U | 8/2018 |
| CN | 109891636 A | 6/2019 |
| CN | 110192293 A | 8/2019 |
| EP | 3537509 A1 | 9/2019 |
| JP | 2016110881 A | 6/2016 |
| KR | 1020150061200 A | 6/2015 |
| KR | 1020160053762 A | 5/2016 |
| KR | 2016-0078035 A * | 7/2016 .......... H01M 10/625 |
| KR | 1020160131657 A | 11/2016 |
| KR | 102057620 B1 * | 2/2017 |
| KR | 1020170020095 A | 2/2017 |
| KR | 1020170050443 A | 5/2017 |
| WO | 2019181501 A1 | 9/2019 |

OTHER PUBLICATIONS

Choi et al., KR 20170020095A Espacenet machine translation, 2017 (Year: 2017).*

* cited by examiner

BATTERY MODULE COMPRISING FLIP PORTION

CROSS-REFERENCE TO RELATED APPLICATION

This application claims priority to Korean Patent Application No. 10-2019-0159872 filed Dec. 4, 2019, the disclosure of which is hereby incorporated by reference in its entirety.

BACKGROUND OF THE INVENTION

Field of the Invention

The present disclosure relates to a battery module.

Description of Related Art

As technological development and demand for mobile devices, electric vehicles, and energy storage systems (ESS) increase, demand for secondary battery cells as an energy source is rapidly increasing. A secondary battery cell is a battery that may be repeatedly charged and discharged because the mutual conversion between chemical energy and electrical energy is reversible.

Such a secondary battery cell includes an electrode assembly such as a positive electrode, a negative electrode, a separator and an electrolyte, which are major components of a secondary battery, and a cell body member of a laminated film case protecting the same.

However, the electrode assembly generates heat as it goes through the process of charging and discharging, and the temperature increase caused by the heat generation may degrade the performance of the secondary battery cell.

In addition, when heat generation becomes severe, the internal pressure of the secondary battery cell may increase, causing the secondary battery cell to ignite.

In addition, when a plurality of secondary battery cells are mounted as in an energy storage system (ESS), the secondary battery cell may explode with such ignition, and a problem of propagating the flame to other secondary battery cells in the vicinity may also occur.

For example, in the related art, since there is no cover member in an electrode tab of a secondary battery cell to prevent the entry of flames, when a fire occurs in a neighboring secondary battery cell, the flame may easily enter an adjacent secondary battery cell, so that preventing the spread of fire is difficult.

Therefore, to prevent the above-described problems or limitations, research on a battery module is required.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Exemplary embodiments provide a battery module in which ignition propagation of a secondary battery cell may be prevented.

Exemplary embodiments provide a battery module in which a flame may be reduced when a secondary battery cell is ignited.

According to an exemplary embodiment, a battery module includes a cell support unit accommodating at least one or more secondary battery cells, a body frame member on which a plurality of the cell support units are installed, and a cover member disposed between the cell support units adjacent to each other. The cover member includes a fixed plate portion fixed between the cell support units adjacent to each other, and a flip portion connected to the fixed plate portion and disposed between electrode tabs of the secondary battery cells adjacent to each other to separate a space between the electrode tabs externally, the flip portion being pushed by internal gas or flame of the secondary battery cell discharged due to rupturing of the secondary battery cell, to be position-moved so that the space between the electrode tabs communicate externally.

The flip portion may be vertically coupled to the fixed plate portion disposed horizontally to the secondary battery cell.

The flip portion may isolate the space between the electrode tabs externally, and may be broken and removed from the fixed plate portion by the internal gas or the flame of the secondary battery cell released due to the rupturing of the secondary battery cell.

The flip portion may isolate the space between the electrode tabs externally, and may have one end portion coupled to the fixed plate portion, the one end portion being bent by the internal gas or the flame of the secondary battery cell released due to the rupturing of the secondary battery cell.

The flip portion may have one end portion, which is coupled to the fixed plate portion and has a wedge groove.

The flip portion may have a vent hole having a width that is reduced from an inner surface in contact with the space between the electrode tabs toward an outer surface.

The fixed plate portion may be provided with a cell gap formation hole disposed in a central portion to form a space between the cell support units adjacent to each other.

The fixed plate portion may be provided with a support tab protruding to be adjacent to the flip portion, one surface of the support tab being provided to be in contact with an inner surface of the flip portion contacting the space between the electrode tabs.

The cover member may be formed of polyphenylene sulfide or a material including a thermosetting polymer reinforced with at least glass fiber.

The cell support unit may include a cell support member accommodating the secondary battery cell in a side portion, and a case member provided to have a "⊏" shape and fitted into at least one of an upper end, a lower end or the upper end and the lower end of the cell support member to surround a side surface of the secondary battery cell.

BRIEF DESCRIPTION OF DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
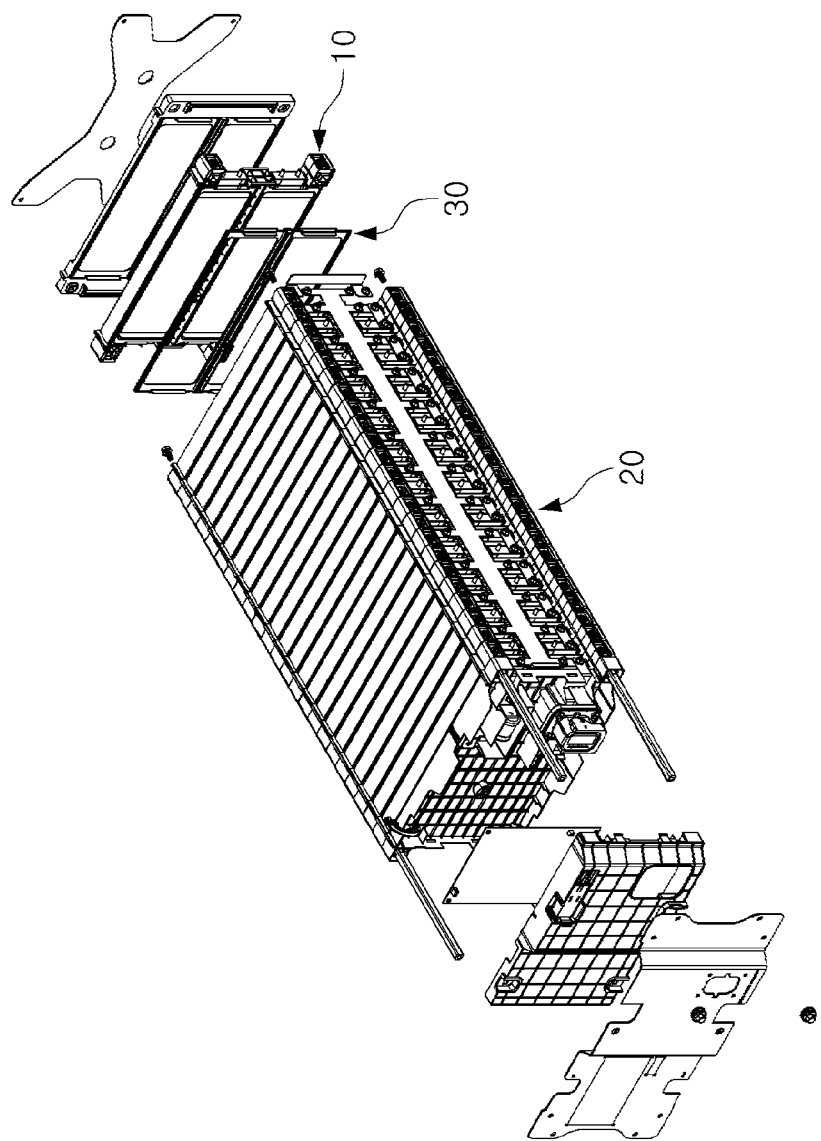
FIG. 1 is a perspective view illustrating a battery module according to an exemplary embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and willfully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiment s are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

A battery module according to an exemplary embodiment of the present disclosure is provided to prevent the propagation of ignition of a secondary battery cell C, and in another aspect, to reduce the flame when the secondary battery cell C is ignited.

In the case of the battery module, since the ignition in any one secondary battery cell C is prevented from propagating to other neighboring secondary battery cells C, the problem of a larger fire may be prevented.

Moreover, in the case of the battery module according to an exemplary embodiment, when a plurality of secondary battery cells C are mounted as in an energy storage system (ESS), the explosion of anyone secondary battery cell C may be prevented from propagating to other neighboring secondary battery cells C, thereby preventing chain explosion.

Figure 2:
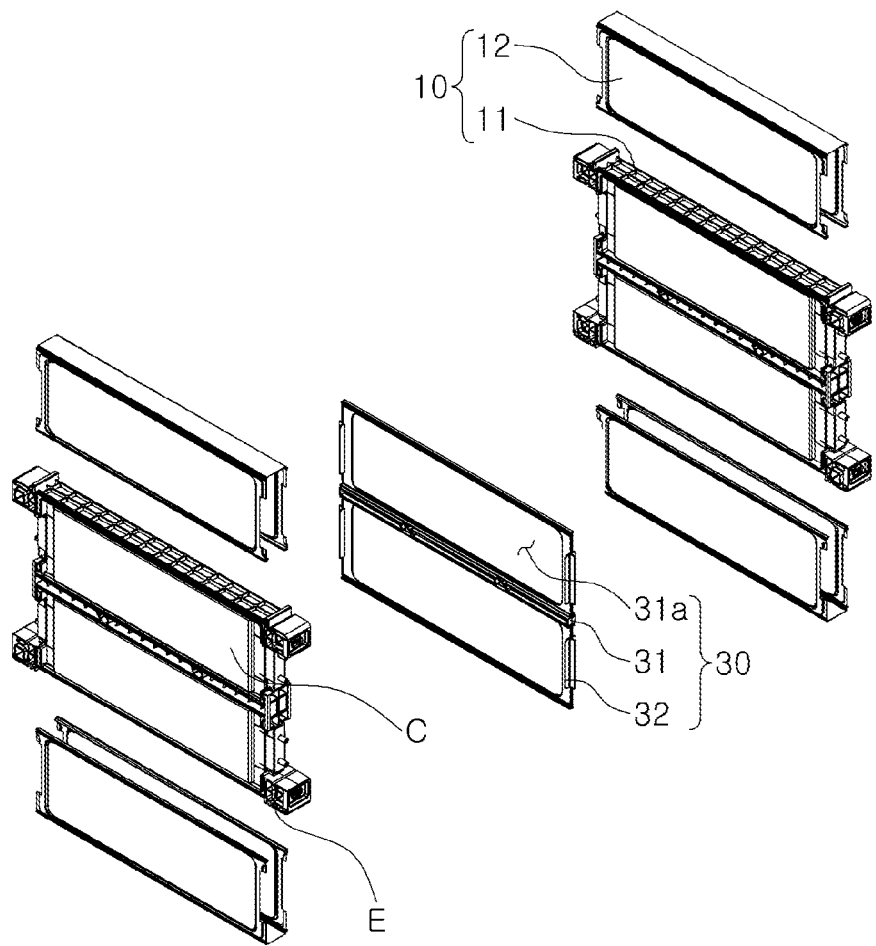
FIG. 2 is a perspective view illustrating a state in which a cover member is disposed between cell support units in a battery module according to an exemplary embodiment.
Figure 3:
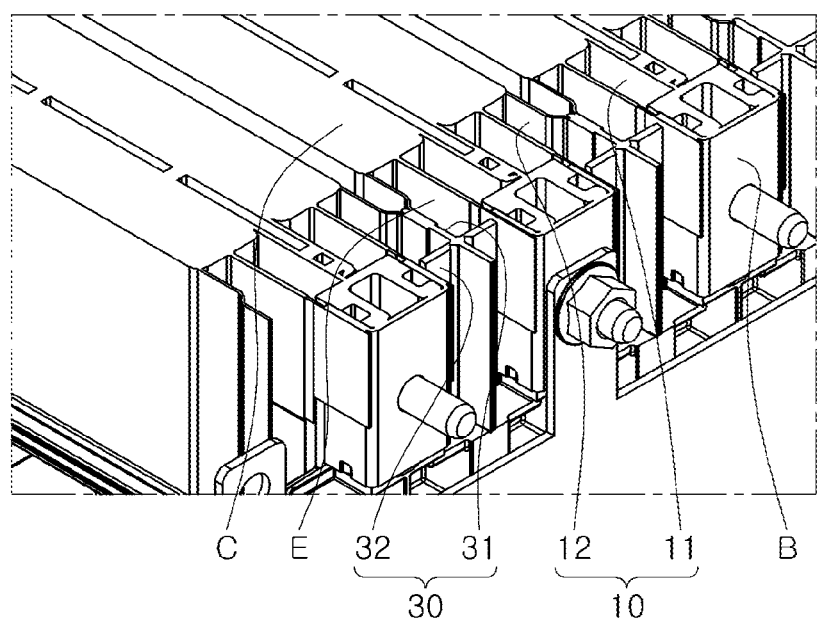
FIG. 3 is a perspective view illustrating a cover member portion in a battery module according to an exemplary embodiment.

In detail, referring to the drawings, FIG. 1 is a perspective view illustrating a battery module according to an exemplary embodiment, and FIG. 2 is a diagram illustrating a state in which a cover member 30 is disposed between cell support units 10 in the battery module according to an exemplary embodiment. FIG. 3 is a perspective view illustrating a portion of the cover member 30 in the battery module according to an exemplary embodiment.

Referring to FIGS. 1 to 3, the battery module according to an exemplary embodiment includes a cell support unit 10 in which at least one secondary battery cell C is accommodated, a body frame member 20 on which the plurality of cell support units 10 are installed, and a cover member 30 disposed between the cell support units 10 adjacent to each other. The cover member 30 may include a fixed plate portion 31 fixed between the cell support units 10 adjacent to each other, and a flip portion 32 connected to the fixed plate portion 31 and disposed between electrode tabs E of the secondary battery cells C adjacent to each other to separate the space between the electrode tabs E from externally thereof, the flip portion 32 being pushed by the internal gas or flame of the secondary battery cell C released due to the rupturing of the secondary battery cell C, to be moved that the space between the electrode tabs E communicates externally.

As such, the battery module according to an embodiment includes the cover member 30 between the adjacent cell support unit 10, and by including the flip portion 32 separating the space between the electrode tabs E of the adjacent cell support units 10 from externally thereof, the flame may be prevented from being transmitted externally, and on the contrary, the flame from the inside may be released to the outside.

To this end, the flip portion 32 separates the space between the electrode tabs E from the outside thereof, and is pushed by the internal gas or flame of the secondary battery cell C emitted due to the rupturing of the secondary battery cell C, to be moved in position such that the space between the electrode tabs E communicates externally.

The cell support unit 10 accommodates the secondary battery cell C, and to this end, for example, the cell support unit 10 may include a cell support member 11 and a case member 12.

For example, the cell support unit 10 of the battery module according to an embodiment may include the cell support member 11 accommodating the secondary battery cell C on a side portion, and the case member 12 having a "⊏" shape and fitted to at least one of an upper end, a lower end or the upper end and the lower end of the cell support member 11 to surround a side surface portion of the secondary battery cell C.

The cell support member 11 has a configuration in which the secondary battery cell C is accommodated, and has a groove-shaped seating portion corresponding to the shape of the secondary battery cell C on the side surface such that the secondary battery cell C is accommodated therein. In addition, the cell support member 11 may be coupled to the case member 12, and thereby, may be configured to surround the remaining side surface of the secondary battery cell C except for the electrode tab E.

In addition, the cell support member 11 may be coupled to a bus bar B connected to the electrode tab E of the secondary battery cell C, thereby connecting the secondary battery cell C to the outside thereof.

The case member 12 is coupled to the cell support member 11 and serves to surround the side surface portion of the secondary battery cell C. To this end, the case member 12 may be provided to have a "⊏" shape, for example, and the case member 12 of the "⊏" shape supports may be fitted and coupled to the upper or lower end portion of the cell support member 11 provided with the secondary battery cell that is accommodated on the side surface portion thereof.

The body frame member 20 serves as a body of the battery module. For example, a plurality of the cell support units 10 are installed on the body frame member 20 to form a module.

In this case, the body frame member 20 may be in the form of a box in which a plurality of cell case units are accommodated, or may be a frame in the form of a bar in which the plurality of cell case units are connectely tied together.

The cover member 30 separates the space between the electrode tabs E of neighboring cell support units 10 from the outside thereof to prevent an external flame from being transmitted to the space between the electrode tabs E. In addition, and may serve to discharge the flame or internal gas of the secondary battery cell C discharged into the space between the electrode tabs E to the outside thereof.

To this end, the cover member 30 is disposed between the cell support units 10 adjacent to each other, and is disposed between the electrode tabs E of the secondary battery cells C accommodated on both sides of the cell support unit 10.

In addition, the cover member 30 includes the flip portion 32 disposed between the electrode tabs E of the secondary battery cells C adjacent to each other, and the fixed plate portion 31 fixing the flip portion 32.

The fixed plate portion 31 is fixed in position between the cell support units 10 adjacent to each other, to serve to support the flip portion 32.

In addition, the fixed plate portion 31 forms a space between the cell support units 10 that are adjacent to each other, to reduce the transfer of heat between the secondary battery cells C mounted on the cell support units 10 adjacent to each other.

For example, in the fixed plate portion 31 of the battery module according to an embodiment, a cell gap formation hole 31a is formed in a central portion thereof to form a space between the cell support units 10 adjacent to each other.

In detail, the fixed plate portion 31 is fixed between the secondary battery cells C seated on the cell support units 10 adjacent to each other, and may form an air gap between neighboring secondary battery cells by the cell gap formation hole 31a in the central portion thereof, thereby performing a thermal insulation function.

Accordingly, even in a case in which any one secondary battery cell C has heat generation, heat is prevented from being transferred to the neighboring secondary battery cell C, thereby preventing problems such as explosion due to an increase in temperature of an additional secondary battery cell C.

The flip portion 32 normally separates the space between the electrode tabs E from the outside thereof, while in a case in which the pressure of the space between the electrode tabs E increases due to flame generation or the like of the secondary battery cell C, the space between the electrode tabs E is communicated with the outside thereof to prevent a problem in which a relatively larger explosion occurs.

To this end, the flip portion 32 is provided on the fixed plate portion 31, and may include a structure that is broken or bent under a certain pressure or more, and a detailed description thereof will be described later with reference to FIGS. 4 and 5.

In this case, the cover member 30 of the battery module according to an embodiment is formed of polyphenylene sulfide, or may be formed of a material including a thermosetting polymer reinforced with glass fibers.

In this manner, restricting the material of the cover member 30 as described above is to prevent the shape of the cover member 30 from deforming due to heat, to block the propagation of external flames. For example, a heat-resistant material is presented, and for example, is limited to a material that does not melt or is not deformed in shape even when exposed at 1000° C. for 10 seconds or more.

Figure 4:
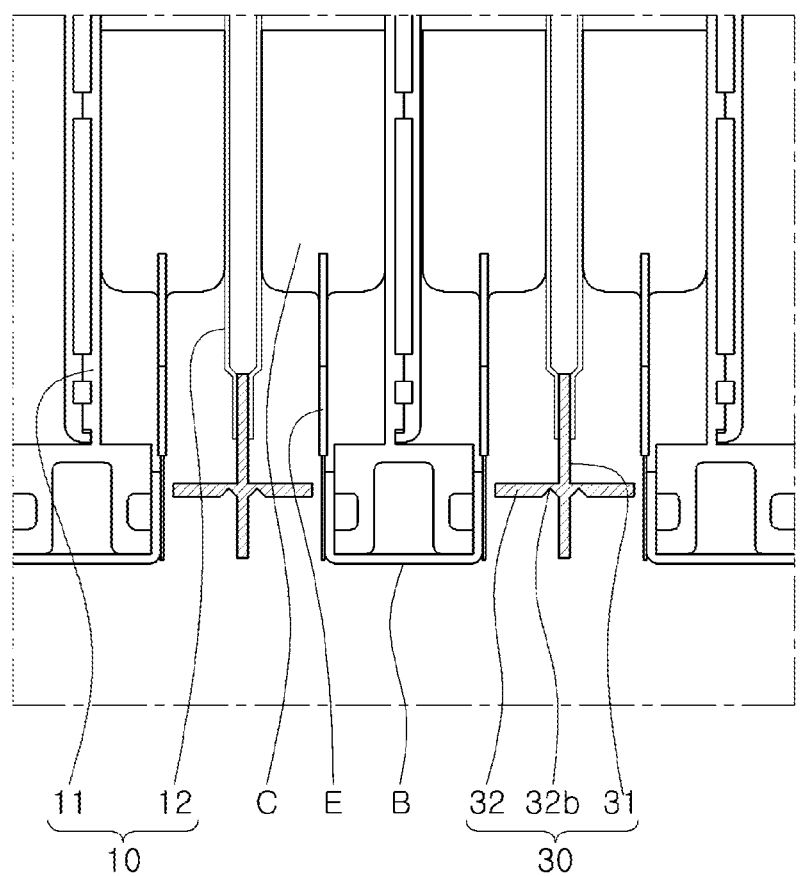
FIG. 4 is a plan cross-sectional view illustrating a cover member portion in a battery module according to an exemplary embodiment.
Figure 5:
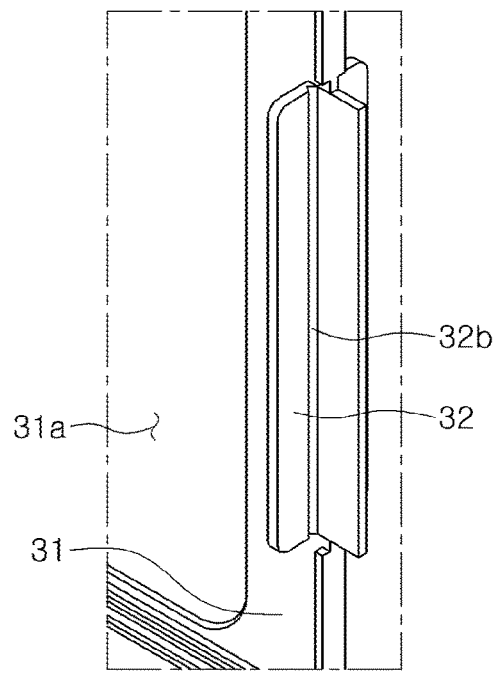
FIG. 5 is a perspective view illustrating a cover member in a battery module according to an exemplary embodiment.

FIG. 4 is a plan cross-sectional view illustrating a portion of the cover member 30 in the battery module according to an exemplary embodiment, and FIG. 5 is a perspective view illustrating the cover member 30 in the battery module according to an exemplary embodiment.

Referring to the drawings, the flip portion 32 of the battery module according to an embodiment is vertically coupled to the fixed plate portion 31 disposed horizontally with the secondary battery cell C.

In this manner, the flip portion 32 is vertically coupled to the fixed plate portion 31 to form a "+" shape, a "T" shape, or the like.

Therefore, the fabrication of the cover member 30 including the flip portion 32 and the fixed plate portion 31 may be facilitated.

However, the shape of the cover member 30 according to an embodiment is not limited to the shape of the "+" shape, the "T" shape, or the like, and may include an angular shape such as a "Y" shape or the like.

In addition, the flip portion 32 of the battery module according to an embodiment separates the space between the electrode tabs E from the outside thereof, and the discharged due to the rupturing of the secondary battery cell C, and may be broken and removed from the fixed plate portion 31 by the internal gas or flame of the secondary battery cell C discharged due to rupturing of the secondary battery cell C.

For example, in order for the flip portion 32 to move so that the space between the electrode tabs E may communicate externally, the flip portion 32 may be broken to be released from the coupling thereof to the fixed plate portion 31, and thus, may be separated to the outside thereof.

Accordingly, since the path through which the space between the electrode tabs E communicates with the outside may be significantly enlarged, the problem of occurrence of an additional explosion is more effectively prevented.

In addition, the flip portion 32 of the battery module according to an embodiment separates the space between the electrode tabs E from the outside thereof, and one end portion of the flip portion 32 coupled to the fixed plate portion 31 is bent by an internal gas or flame of the secondary battery cell C discharged due to the rupturing of the secondary battery cell C.

For example, to communicate the space between the electrode tabs E externally, the flip portion 32 is deformed to have a shape in which one end portion thereof is bent, and is moved to secure a path in which the internal gas or flame of the secondary battery cell C is discharged to the outside thereof, while maintaining the coupling thereof to the fixed plate portion 31.

Accordingly, while securing a path through which the space between the electrode tabs E communicates externally, a problem in which the flip portion 32 is separated and collides with another secondary battery cell C may be prevented. In detail, a problem in which the other secondary battery cells C are damaged due to collision thereof with the flip portion 32 may be prevented.

In this case, the flip portion 32 of the battery module according to an embodiment may be characterized in that a wedge groove 32b is formed in one end portion thereof coupled to the fixed plate portion 31.

By the wedge groove 32b, a position on which the flip portion 32 is broken on the fixed plate portion 31 or a position on which one end of the flip portion 32 coupled to the fixed plate portion 31 is bent, due to the internal gas or flame of the secondary battery cell C released due to the rupturing of the secondary battery cell C, is limited.

In addition, by the wedge groove 32b, the breakage of the flip portion 32 by the internal gas or flame of the secondary battery cell C released due to the rupturing of the secondary battery cell C may be facilitated, or the bending of one end of the flip portion 32 may be facilitated.

To this end, the wedge part may be formed as a groove of a "V" shape or a "U" shape.

Figure 6:
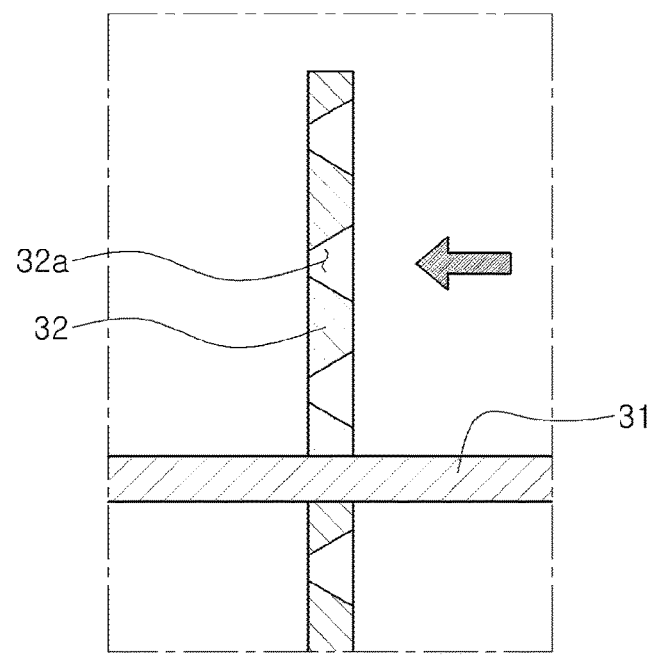
FIG. 6 is a plan cross-sectional view illustrating an embodiment in which a vent hole is formed in a flip portion of a cover member in a battery module according to an exemplary embodiment.

FIG. 6 is a plan cross-sectional view illustrating an embodiment in which a vent hole 32a is formed in the flip portion 32 of the cover member 30 in the battery module according to an exemplary embodiment. Referring to FIG. 6, the flip portion 32 of the battery module according to an embodiment is provided with the vent hole 32a having a width reduced from an inner surface thereof contacting the space between the electrode tabs E toward an outer surface.

By this vent hole 32a, while enabling the flame to be discharged from an interior space that is a space between the electrode tabs E to the exterior space outside the space, the entry of flame into the interior space that is the space between the electrode tabs E from the exterior space may be blocked.

The effect of preventing the discharge of flame and the entry of flame as described above may be provided since the width of the vent hole 32a formed on the inner surface in contact with the space between the electrode tabs E is greater than the width formed on the outer surface.

In detail, in order for the flame to enter the inner space from the outside, the flame should pass through an area of a relatively small width, and in this case, the contact area with oxygen rapidly decreases by the reduced width, and thus, the flame is dissipated to block entry thereof into the inner space.

On the contrary, when the flame is discharged from the inner space to the outside, since the width of the path through which a flame passes gradually decreases and the contact area with oxygen decreases in sequence, the flame or heat may be discharged to the outside while preventing the dissipation of the flame.

Figure 7:
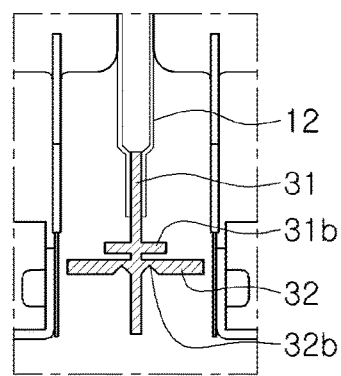
FIG. 7 is a plan sectional view illustrating an embodiment in which a support tab is formed on a fixed plate portion of a cover member in a battery module according to an exemplary embodiment.

FIG. 7 is a cross-sectional plan view illustrating an embodiment in which a support tab 31b is formed on the fixed plate portion 31 of the cover member 30 in the battery module according to an exemplary embodiment. Referring to FIG. 7, the fixed plate portion 31 of the battery module according to an embodiment is provided with the support tab 31b that is formed to protrude adjacent to the flip portion 32. One surface of the support tab 31b may be provided to be in contact with the inner surface of the flip portion 32 in contact with the space between the electrode tabs E.

Therefore, the flip portion 32 may be broken and removed or bent so that the internal gas or flame of the secondary battery cell C is discharged from the internal space between the electrode tabs E to the external space. Conversely, a problem in which the flip portion 32 is broken and removed or bent in order for gas or flame of the external space to enter the internal space between the electrode tabs E may be prevented.

For example, in the case in which the gas or flame of the external space pushes the flip portion 32 to enter the internal space between the electrode tabs E, one end of the flip portion 32 coupled to the fixed plate portion 31 is supported by the support tab 31b, and may thus have relatively high resistance.

Conversely, when the internal gas or flame of the secondary battery cell C is discharged from the internal space between the electrode tabs E to the external space, since the support tab 31b does not support the flip portion 32, the flip portion 32 may be broken and removed or bent with a relatively small amount of resistance force.

As set forth above, a battery module according to an embodiment has an advantage of preventing ignition propagation of secondary battery cells.

In another aspect, the battery module according to an embodiment has an advantage of reducing flame when the secondary battery cell is ignited.

In addition, the battery module according to an embodiment prevents the problem that when a plurality of secondary battery cells are mounted as in an energy storage system (ESS) or the like, the explosion of any one secondary battery cell is propagated to other secondary battery cells therearound, causing a chain explosion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:
    a plurality cell support units accommodating at least one or more secondary battery cells;
    a body frame member on which the plurality of the cell support units are installed;
    and a cover member disposed between the cell support units adjacent to each other,
    wherein the cover member includes,
    a fixed plate portion fixed between the cell support units adjacent to each other;
    a flip portion connected to the fixed plate portion and disposed between electrode tabs of the secondary battery cells adjacent to each other to separate a space between the electrode tabs externally,
    wherein the flip portion has one end portion, which is coupled to the fixed plate portion and has a wedge groove,
    wherein the flip portion is configured to be deformed at the wedge groove or be separated from the cover member to open the space externally, by internal gas or flame of the secondary battery cells discharged due to rupturing of the secondary battery cells, and
    wherein via the wedge groove, a position of bending or rupturing of the flip portion is limited.

2. The battery module of claim 1, wherein the flip portion is vertically coupled to the fixed plate portion disposed horizontally to the secondary battery cells.

3. The battery module of claim 1, wherein the flip portion provides a dividing boundary from the space between the electrode tabs from the outside of the battery module, and is broken and removed from the fixed plate portion by the internal gas or the flame of the secondary battery cells released due to the rupturing of the secondary battery cells.

4. The battery module of claim 1, wherein the flip portion provides a dividing boundary from the space between the electrode tabs from the outside of the battery module, and has the one end portion of the flip portion coupled to the fixed plate portion, the one end portion being bent by the internal gas or the flame of the secondary battery cells released due to the rupturing of the secondary battery cells.

5. The battery module of claim 1, wherein the flip portion has a vent hole having a width that is reduced from an inner surface in contact with the space between the electrode tabs toward an outer surface.

6. The battery module of claim 1, wherein the fixed plate portion is provided with a cell gap formation hole disposed in a central portion to form a space between the cell support units adjacent to each other.

7. The battery module of claim 1, wherein the fixed plate portion is provided with a support tab protruding to be adjacent to the flip portion, one surface of the support tab being provided to be in contact with an inner surface of the flip portion contacting the space between the electrode tabs.

8. The battery module of claim 1, wherein the cover member is formed of polyphenylene sulfide or a material including a thermosetting polymer reinforced with at least glass fiber.

9. The battery module of claim 1, wherein the cell support unit comprises:
    a cell support member accommodating the secondary battery cells in a side portion; and
    a case member provided to have a "⊏" shape and fitted into at least one of an upper end, a lower end or the upper end and the lower end of the cell support member to surround a side surface of the secondary battery cells.

* * * * *